W. H. ANDERSON.
FARM GATE.
APPLICATION FILED MAR. 17, 1914.
1,117,754.
Patented Nov. 17, 1914.
3 SHEETS—SHEET 2.
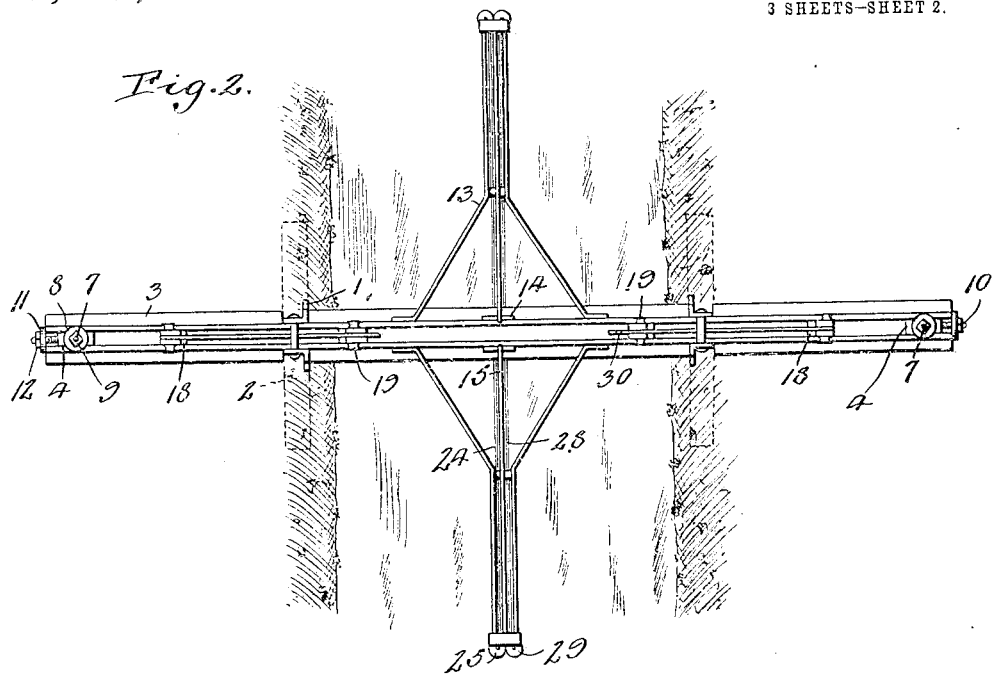
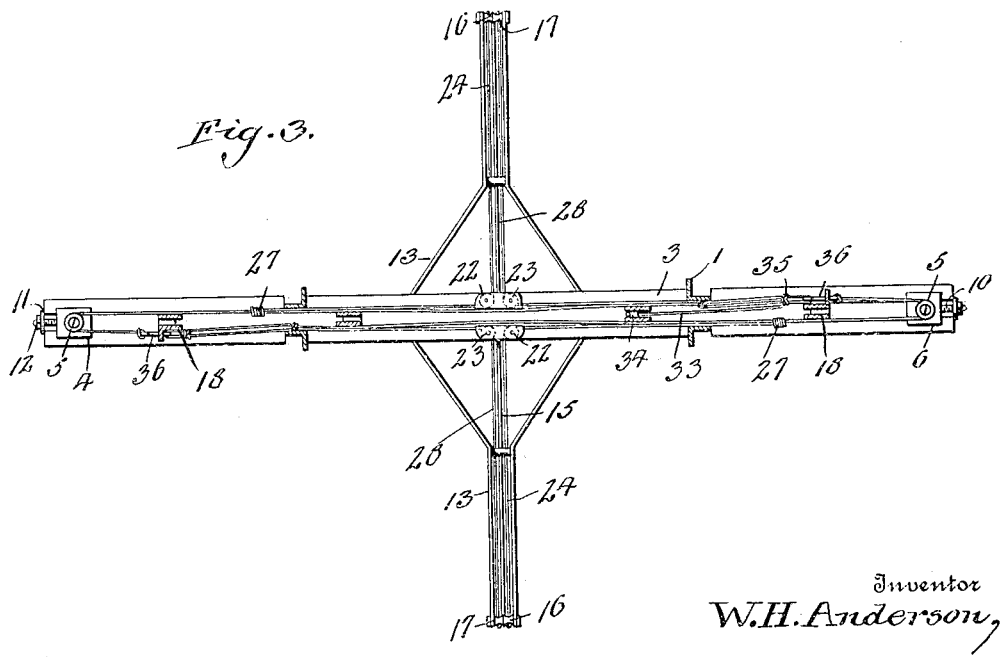
Inventor
W. H. Anderson,
Witnesses
By Victor J. Evans.
Attorney

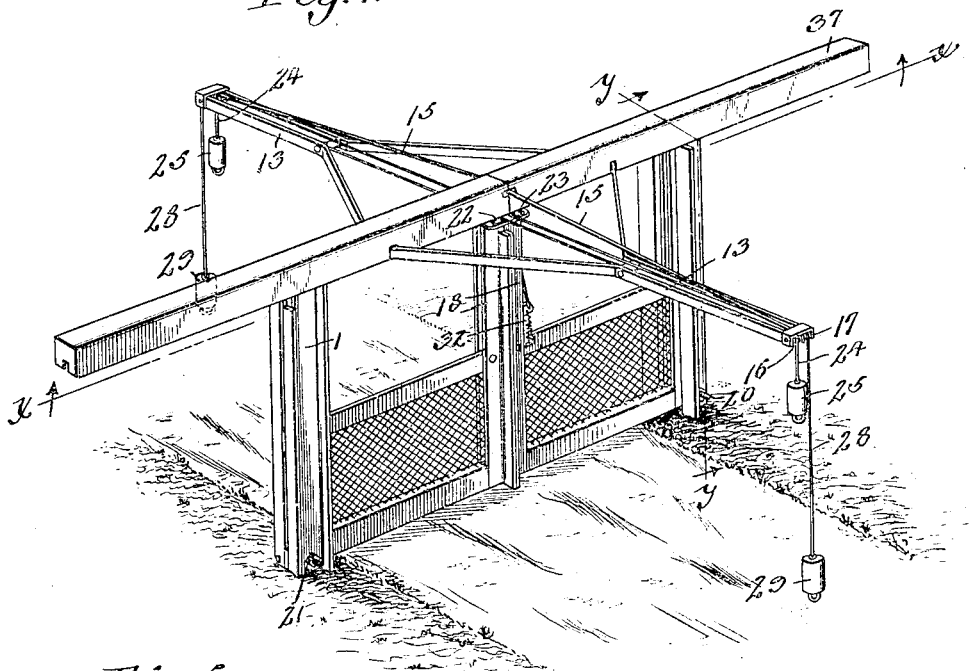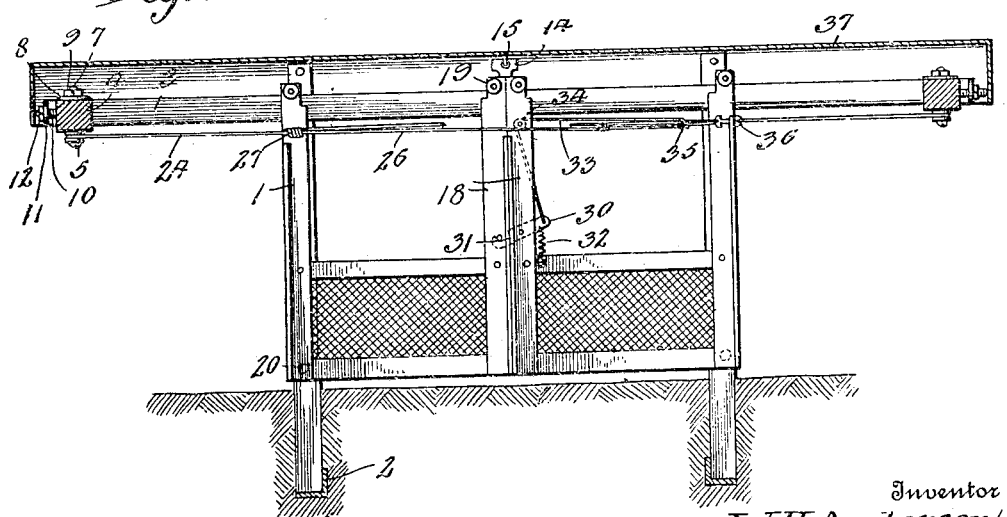

W. H. ANDERSON.
FARM GATE.
APPLICATION FILED MAR. 17, 1914.

1,117,754.

Patented Nov. 17, 1914.
3 SHEETS—SHEET 3.

Witnesses
E. C. Anderson Jr.
V. B. Hillyard.

Inventor
W. H. Anderson,
By Victor J. Evans
Attorney

UNITED STATES PATENT OFFICE.

WILLIAM H. ANDERSON, OF WASHTA, IOWA.

FARM-GATE.

1,117,754.  Specification of Letters Patent.  Patented Nov. 17, 1914.

Application filed March 17, 1914. Serial No. 825,359.

*To all whom it may concern:*

Be it known that I, WILLIAM H. ANDERSON, a citizen of the United States, residing at Washta, in the county of Cherokee and State of Iowa, have invented new and useful Improvements in Farm-Gates, of which the following is a specification.

The primary object of this invention is the provision of an all-metal gate for controlling the openings in fences and other inclosures leading to farms, pastures and other inclosed parcels of land.

The invention relates to gates of the sliding type which are so arranged as to be operated from either approach, whereby the gate may be opened upon approaching the inclosure and may be closed after passing through the opening in the fence or inclosing means.

The invention provides the novel structure for slidingly supporting the leaves or members of the gate, such structure being provided with adjusting means for alining the leaves or members of the gate to insure their movement in the same plane and such structure having its component parts firmly connected so as to be braced and stayed in every direction.

A further purpose of the invention is the provision of a novel arrangement of operating cords and pulleys, whereby the gate may be opened from either approach and easily and positively closed after the person has passed through the gate opening, the system of operating cords including a latch mechanism which is automatically released when pulling upon the gate operating cord or member and which latch automatically engages to secure the gate when closed.

The invention also contemplates an adjusting device of peculiar structure whereby any slack in the operating cords or connections may be taken up so as to insure positive and certain operation of the latch mechanism which is essential to the operativeness and efficiency of the gate structure.

The invention consists of the novel features, details of construction and combination of parts, which hereinafter will be more particularly set forth, illustrated and claimed.

Figure 4:
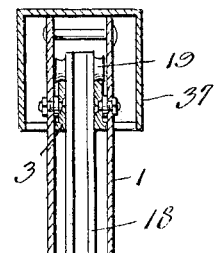
Figure 7:
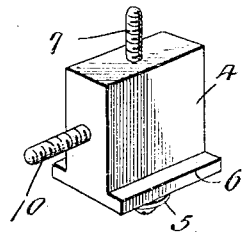
Figure 8:
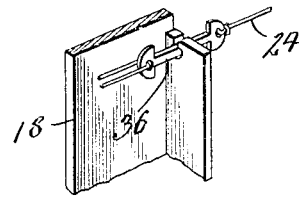
Figure 6:
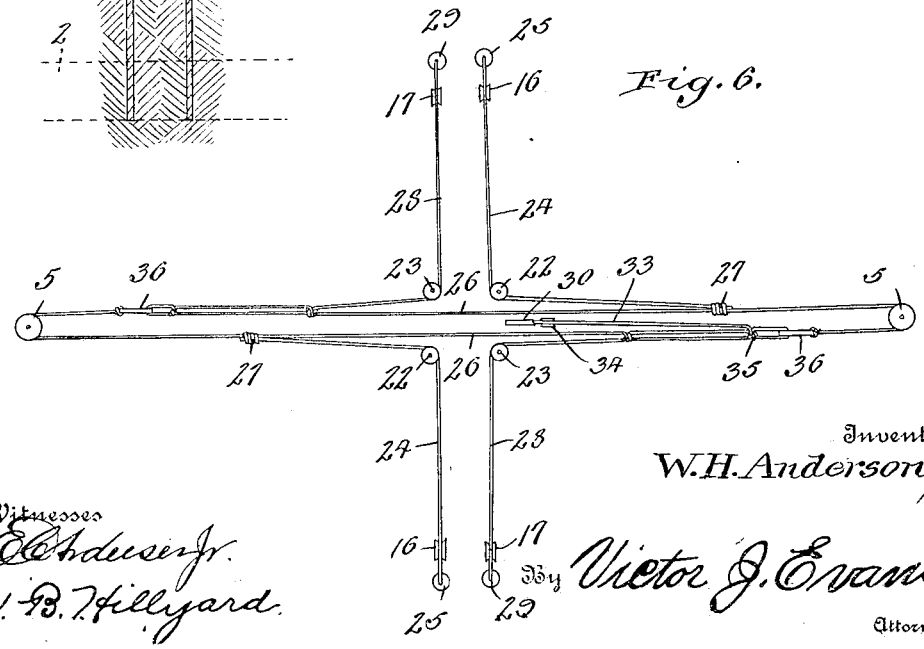

In the drawings hereto attached:—Figure 1 is a perspective view of a gate embodying the invention. Fig. 2 is a top plan view, the housings inclosing the track and posts being omitted. Fig. 3 is a horizontal section on the line $x$—$x$ of Fig. 1, looking upward as indicated by the arrows. Fig. 4 is a vertical transverse section on the line $y$—$y$ of Fig. 1, looking in the direction of the arrows. Fig. 5 is a vertical central longitudinal section in the plane of the gate. Fig. 6 is a diagrammatic view of the operating cords and pulleys. Fig. 7 is a detail view of one of the takeup devices. Fig. 8 is a detail view of the sliding connection between the system of operating cords and a leaf or member of the gate.

Corresponding and like parts are referred to in the following description, and indicated in all the views of the drawing, by the same reference characters.

The supporting structure comprises posts or uprights which are arranged at opposite sides of the opening in the fence or other inclosing means and a track connecting the upper ends of the posts and extending over the gate opening and beyond the same at each side to provide a suitable support for the leaves or members comprising the gate. The posts or uprights are of like formation, each consisting of similar members 1 which are spaced apart to admit of a leaf or member of the gate operating between them. An anchor 2 is attached to the lower ends of the members 1. In the preferable construction the members 1 and anchor 2 are formed of angle bars. The anchor 2 is of such a length as to insure the post obtaining a firm footing in the ground. When the posts are set upon the anchor 2 the lower ends of the members 1 are buried in the ground a sufficient distance to insure the formation of a substantial structure. The track comprises similar members 3 which are spaced apart and arranged in parallel relation and secured between the upper ends of the members comprising the gate posts or uprights. The track members 3 consist of angle irons and are arranged with one of their flanges in vertical position and the other flange in horizontal position, the horizontal flanges facing outward and the vertical flanges being spaced apart a distance to receive the upper portions of the leaves or members comprising the gate. A block 4 is arranged between the extremities of the track members 3 and is provided upon its lower side with a pulley 5. The block is formed at its lower end with lateral flanges 6 which underlap the track members 3. A threaded stem 7 projects upward from the block and receives a washer 8 and nut 9. The washer 8 overlaps the upper edges of the track members and upon tightening the nut 9 the block is retained in place by having the track members clamped between the flanges 6 and washer 8. A threaded stem 10 projects longitudinally from the block 4 beyond the extremities of the track members and receives a washer 11 and nut 12. By turning the nut 12 the block may be adjusted longitudinally of the track whereby provision is had for taking up any slack in the operating cords or like operating means so as to insure positive and certain operation of the latch mechanism when it is required to open the gate.

An arm 13 projects laterally from the track in each direction and overhangs the roadway. This arm is formed of complemental bars which have their inner ends secured to a track member and their outer ends spaced apart a short distance, the inner portions of the bars being spread so as to brace the arm laterally or in the direction of the length of the track. A post 14 projects upward from each track member and a brace 15 connects the upper end of such post with the outer end of the arm 13 to stay the latter vertically so as to resist the strain when pulling upon the operating cords or members. A pair of pulleys 16 and 17 is provided for the outer end of each arm 13 to receive the vertical portions of the operating cords or members. One pulley of each pair receives the cord or member which when pulled upon opens the gate and the other pulley receives the cord or member which when pulled upon closes the gate. To avoid confusion, the operating cords or members have the same relation at each approach and the same is true of the gate closing cords or members. This results in a reverse arrangement of the operating cords or members when viewed from one approach.

The gate comprises similar leaves or members 18 which are arranged to operate between the members 1 and 3. Each leaf or member 18 is formed of upright and longitudinal member, the longitudinal members consisting of flat bars, whereas the upright members are formed of angle bars which are arranged with one of their flanges facing outward and the other being arranged in the plane of the gate. The upright members of each leaf or member 18 of the gate have their upper end portions passing between the track members 3 and provided at their upper projecting ends with wheels 19 arranged to travel upon the track members 3 and support the leaves 18. The upper ends of the laterally extending flanges of the gate uprights are cut away so as to clear the track members and form stops to prevent vertical displacement of the gate. The lower portion of each leaf or member 18 may be protected so as to prevent small stock from passing through the gate, such protection usually consists of wire fabric. The lower edges of the leaves or members 18 may be adjusted laterally so as to aline, this being effected by means of adjusting screws 20 which are threaded thereto the members 1 and which are provided with jam nuts 21 to hold the adjusting screws in the required position.

It is to be understood that the gate may be opened or closed from either approach or may be opened from one approach and closed after passing through the gate opening. The operating connections are substantially the same for each approach and like reference numerals designate corresponding parts. A pair of guide pulleys 22 and 23 is mounted upon each track member 3 in line with the arm 13. A cord or flexible connection 24 is attached at one end to each of the leaves or members 18 and passes around the guide pulleys 5, 22, and 16 its opposite end portion being loose and hanging vertically and provided with a weight 25 which serves both as a grip and means to take up slack and hold the cord or part 24 under tension. When pulling upon the loose or weighted end of the part 24 the leaf or member 18 connected thereto is caused to move outward and disclose the gate opening. The opposite gate or leaf 18 is simultaneously moved outward by means of a cord or flexible connection 26 which is attached at one end to such leaf or member and has its opposite end attached to the cord or part 24 at 27. It will thus be understood that a pull upon the loose end of either one of the cords 24 will effect a simultaneous outward movement of both leaves or members 18, thereby fully opening the gate. A cord or like flexible connection 28 is secured at one end to the cord 26, near the leaf or member 18 and passes around the guide pulley 23 and over the guide pulley 17, its opposite end being loose and hanging vertically and being provided at its free end with a weight 29, which serves as a grip as well as means for taking up slack in the cord 28. A pull upon the loose end of either one of the cords 28 causes the leaf or member 18 connected therewith to move inward and such leaf pulling upon the cord 24 attached directly to the leaf produces a corresponding movement of the cord 26 which is attached to such cord 24 and the opposite leaf 18 thereby drawing the latter inward, with the result that both leaves are moved inward when pulling upon the loose end of either one of the cords or connections 28.

The gate when closed is made secure by means of a latch 30 which is mounted upon one of the leaves or members 18 and engages a pin or like part 31 upon the other leaf or member 18. The latch 30 is pivoted and is acted upon by means of a retractile spring 32. When the leaves or members 18 of the gate are drawn together the latch 30 automatically engages the pin 31 thereby securing the leaves or members 18. A cord 33 is attached at one end to the latch 30 and passes over a guide pulley 34 at the upper end of the gate provided with a latch 30 and has its opposite end secured at 35 to the cord 26 nearer thereto. In order that provision may be had for a movement of the cord 33 sufficient to release the latch 30 when pulling upon either one of the cords 24, the cords 24 and 26 have a sliding connection with each leaf or member 18 and this is accomplished by means of a link 36 which passes loosely through a flange at the inner end of each of the leaves or members 18. The length 36 has an eye at each end to which the respective cords or connections 24 and 26 are attached, said eyes also constituting stops which limit the movement of link in each direction. When pulling upon either one of the cords 24 the link or slide connection 36 moves thereby permitting the latch 30 to be operated so as to release the leaves or members 18 so that a continued pull upon the cord 24 opens the gate. A pull upon either one of the cords 28 closes the gate in the manner stated, the latch being automatically in operation to secure the gate members. A suitable housing 37 is arranged over the track to protect the same, the gate and the gate operating means from the weather such as rain, sleet, snow and the like.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described that invention, what is claimed as new is:—

1. In combination, gate posts at the sides of a gate opening, each of such posts comprising spaced members, leaves and members slidably mounted between the members comprising the gate post and adjusting screws mounted in the members of the gate posts and adapted to engage the leaves or members of the gate to admit of alining the same laterally.

2. In combination, gate posts at the side of a gate opening, each of such posts comprising spaced members, a track connecting the upper ends of the gate posts and projecting beyond the same in opposite directions, leaves mounted upon the track to slide between the members of the posts and adjusting screws mounted in the members of the posts near their lower ends to engage the sides of such leaves to admit of alining the same laterally.

3. In combination, a track, two leaves slidably mounted upon the track, guide pulleys at the ends of the track, pairs of guide pulleys intermediate of the ends of the track, arms projecting from the track in opposite directions, pairs of guide pulleys at the outer ends of the arms, operating cords passing over one of the guide pulleys of each pair and around the guide pulleys at the ends of the track and attached to the leaves to effect an outward movement thereof by a direct pull upon the cord, other cords connecting the first mentioned cords with the opposite leaves to effect a simultaneous outward movement thereof, a third set of cords passing over the other guide pulleys of the pairs and attached to the second set of cords, the arrangement being such that a pull upon either one of the third set of cords causes both leaves to move inward.

4. In combination, a track, two leaves slidably mounted upon the track, a system of operating cords to effect a simultaneous opening or closing of the leaves, such cords having a limited sliding connection with the leaves, guide pulleys for supporting and giving proper direction to the operating cords, a latch for securing the leaves when closed, connecting means between the latch and the system of operating cords to effect a release of the latch when pulling upon either one of the cords to effect an outward movement of the leaves and take up devices at the ends of the track for adjusting the cords to insure positive movement of the latch preliminary to the application of the force to effect an opening of the leaves.

In testimony whereof I affix my signature in presence of two witnesses.

WILLIAM H. ANDERSON.

Witnesses:
J. C. ROBERTSON,
CLEM STRATTON.

Copies of this patent may be obtained for five cents each, by addressing the "Commissioner of Patents, Washington, D. C."